W. M. DALTON.
AUTOMATIC RAT KILLING DEVICE.
APPLICATION FILED MAR. 23, 1915.
1,199,054.
Patented Sept. 26, 1916.
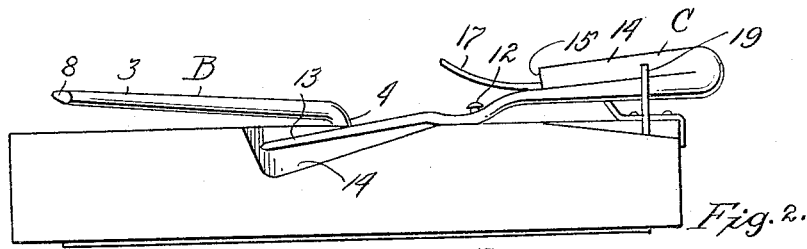
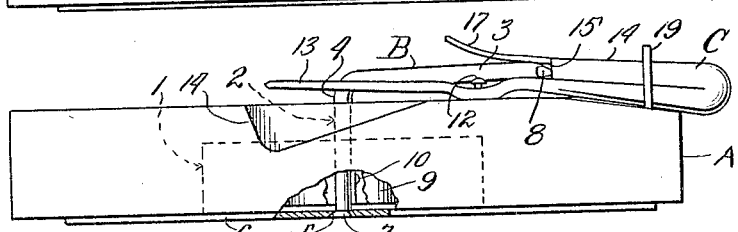
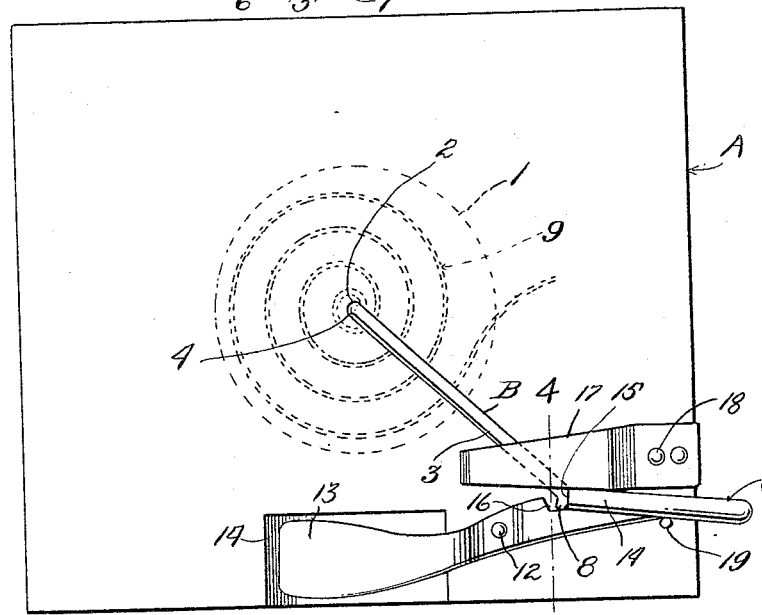
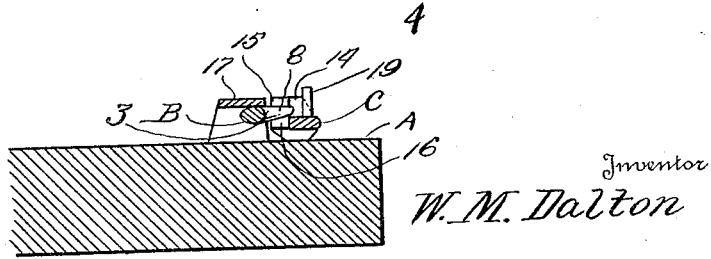
Inventor
W. M. Dalton

UNITED STATES PATENT OFFICE.

WILLIAM M. DALTON, OF AMERICA JUNCTION, ALABAMA, ASSIGNOR OF ONE-HALF TO E. T. HENDON, OF AMERICA JUNCTION, ALABAMA.

AUTOMATIC RAT-KILLING DEVICE.

1,199,054. Specification of Letters Patent. Patented Sept. 26, 1916.

Application filed March 23, 1915. Serial No. 16,392.

*To all whom it may concern:*

Be it known that I, WILLIAM M. DALTON, a citizen of the United States, residing at America Junction, in the county of Walker, State of Alabama, have invented certain new and useful Improvements in Automatic Rat-Killing Devices; and I do hereby declare the following to be a full, clear, and exact description of the invention, such as will enable others skilled in the art to which it appertains to make and use the same.

This invention relates to certain novel and useful improvements in traps for killing rats, mice and other small animals, and has particular application to traps of that type wherein a spring actuated killing arm is adapted to be released by the animal, the trap being automatically reset after it is released.

In carrying out my invention it is my purpose to provide a killing trap of this type which will embody the desired features of simplicity, efficiency and reliability, and which will be immediately sprung to swing the arm to kill the animal, immediately such animal depresses the trigger of the trap, the trap being automatically reset after the trap has been swung and the killing arm has performed its function.

With the above recited objects and others of a similar nature in view, my invention consists in the construction, combination and arrangement of parts set forth in and falling within the scope of the appended claim.

In the accompanying drawings: Figure 1 is a view in side elevation of a trap embodying my invention and showing the trap set. Fig. 2 is a similar view thereof showing the trap in released position. Fig. 3 is a top plan view. Fig. 4 is a cross sectional view taken on the line 4—4 of Fig. 3.

Referring now to the accompanying drawings in detail, the letter A designates the base of the trap, which may be in the form of a block or plate and is provided with a relatively large recess 1 in the underside thereof, a vertical bore 2 extending from the recess through the top of the central portion of the base. An angular killing arm B is provided, the relatively long horizontal striking section 3 of which is adapted to swing above the top surface of the base, while the vertical shaft section 4 thereof extends through the bore 2 in the base and has its lower end projected through an opening 5 in the cover plate 6 covering the recess in the bottom of the base. The lower end of this vertical section of the arm is preferably provided with a head 7 for preventing the disengagement of the arm from the base, while at the same time the arm is free to swing or turn. The free end of the striking section of the arm is preferably bent laterally and flattened and sharpened as at 8. Within the recess 1 is seated the relatively powerful coiled operating spring 9, one end of which is attached as at 10 to the shaft section 4 of the angular arm, while the opposite end is attached as at 11 to the wall of the recess. Thus it will be seen that when the spring is wound, if the striking section 3 of the arm is released from the trigger, hereinafter described, the coil spring will throw or rotate the arm with a quick powerful stroke, so that the end of the arm contacting with the animal will strike the latter a blow sufficiently powerful to kill such animal and to throw the body thereof away from the trap. After this takes place the arm is arrested and reset or held by the mechanism which I will now proceed to describe.

The letter C indicates a trigger or tripping device which is pivoted as at 12 upon the base board adjacent one side thereof and in line with the arc or circle described by the striking section of the arm sweeping over the bore. The inner end portion of this trigger is in the nature of a relatively wide flat plate 13 which is adapted to be depressed into the recess 14 formed in the upper surface of the base board. On this plate 13 is adapted to be fastened the bait for the animal, the construction being such that the plate 13 may be depressed into the recess either by the action of the animal pulling downward upon the bait fastened to the arm 13 or by the act of the animal placing its weight upon this plate 13, as by the act of stepping thereon. The outer end of the trigger C is bent upward and back upon itself to form a stop bar 14, the end 15 of which is adapted to engage with and hold the end 8 of the striking arm when the trap is set. Directly below this end 15 of the stop bar 14 the body of the trigger is cut away or slotted as at 16 so that in the act of releasing the trigger by elevating the end thereof carrying the stop bar, which occurs when the plate 13 is depressed, this slot will allow the trigger to be elevated out of contact with the end 8 of the arm. When such releasing action takes place, the arm in swinging around will strike the animal a sharp, quick, powerful blow, killing the animal and throwing it away from the baseboard. As the end of the trigger carrying the stop bar is heavier than the end carrying the tripping plate 13, the trigger will immediately drop to its normal position with the plate 13 elevated, and the end carrying the stopping bar resting upon the base-board. After the sweeping striking arm strikes the animal, it will continue its movement toward the normally positioned trigger, and will be guided into set engagement therewith by the guide arm 17 which is fastened as at 18 to the base, and is concaved or curved so that as the sweeping arm passes thereunder, such arm will be guided downward until the end 8 thereof again strikes against the end 15 of the stop bar and is held thereby until the plate 13 is again depressed.

From the above description, taken in connection with the accompanying drawings, the construction and operation of the trap will be readily understood. It will thus be seen that upon the depression of the plate 13 the striking arm is released and slips beneath the guide arm and over the base-board until it strikes the animal and kills the latter. With the completion of its swinging movement the end 8 of the arm again moves up against the end of the stop bar of the trigger, and as such trigger is now in its normal position, the swinging arm is caught and again set.

If desired a small guide member, in the nature of a pin or stud, shown at 19 may be placed upon the board so that the operation of the trigger carrying the stop bar will always be guided in a true vertical line by this pin at one side and the guide arm at the opposite side.

What I claim is:

The combination with a base having a recess at one edge thereof, of a spring actuated striking arm supported to revolve over said base and having a radially extending portion lying close to the base, a trigger pivoted adjacent the recess and including a depressible portion extending over the recess, said trigger being cut away at one side and having the end remote from the recess bent backward to lie against the body of the trigger, the extremity of said end being abruptly cut off to form a stop shoulder against which the striking portion of the striking arm impinges said shoulder being elevated upon the depression of the tripping plate to release the striking arm, and a spring guide fixed to the base and extending substantially parallel to the trigger and having an upturned free end, said guide being positioned and arranged to direct the end of the striking arm against the abrupt shoulder.

In testimony whereof, I affix my signature, in the presence of two witnesses.

WILLIAM M. DALTON.

Witnesses:
E. I. GILCHRIST,
BERT HOLLINGSHEAD.

Copies of this patent may be obtained for five cents each, by addressing the "Commissioner of Patents, Washington, D. C."